United States Patent
Xie

(10) Patent No.: US 12,441,285 B2
(45) Date of Patent: Oct. 14, 2025

(54) ELECTROMECHANICAL BRAKE SYSTEM FOR A MOTOR VEHICLE, METHOD

(71) Applicant: Robert Bosch GmbH, Stuttgart (DE)

(72) Inventor: Fei Xie, Gemmrigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 41 days.

(21) Appl. No.: 18/549,250

(22) PCT Filed: May 25, 2022

(86) PCT No.: PCT/EP2022/064195
§ 371 (c)(1),
(2) Date: Sep. 6, 2023

(87) PCT Pub. No.: WO2022/253663
PCT Pub. Date: Dec. 8, 2022

(65) Prior Publication Data
US 2024/0140386 A1    May 2, 2024

(30) Foreign Application Priority Data
Jun. 1, 2021 (DE) ............... 10 2021 205 581.8

(51) Int. Cl.
*B60T 13/74* (2006.01)
*B60T 17/22* (2006.01)

(52) U.S. Cl.
CPC .......... *B60T 13/741* (2013.01); *B60T 17/221* (2013.01); *B60T 2270/402* (2013.01); *B60T 2270/403* (2013.01)

(58) Field of Classification Search
CPC ................ B60T 13/741; B60T 17/221; B60T 2270/402; B60T 2270/403;
(Continued)

(56) References Cited

U.S. PATENT DOCUMENTS

| | | |
|---|---|---|
| 5,090,518 A | 2/1992 | Schenk et al. |
| 2009/0223752 A1 | 9/2009 | Kim |
| | (Continued) | |

FOREIGN PATENT DOCUMENTS

| | | |
|---|---|---|
| DE | 102018111573 A1 | 11/2018 |
| EP | 3318458 B1 | 4/2020 |
| | (Continued) | |

OTHER PUBLICATIONS

International Search Report for PCT/EP2022/064195, Issued Nov. 29, 2022.

*Primary Examiner* — Lindsay M Low
*Assistant Examiner* — Charles J Brauch
(74) *Attorney, Agent, or Firm* — NORTON ROSE FULBRIGHT US LLP

(57) ABSTRACT

An electromechanical brake system for a motor vehicle. The brake system includes four wheel brake devices, four primary electric motors, four secondary electric motors, and four control devices. The control devices are designed to acquire and/or evaluate sensor data from sensors assigned to the wheel brake devices and/or to the motor vehicle. Each of the wheel brake devices is assigned one of the primary electric motors and one of the secondary electric motors respectively for operating the respective wheel brake devices. Each of the control devices is respectively assigned to one of the primary electric motors of one of the wheel brake devices and to one of the secondary electric motors of another of the wheel brake devices for actuating the electric motors.

9 Claims, 1 Drawing Sheet

(58) Field of Classification Search
CPC ......... B60T 2270/404; B60T 2270/413; B60Y 2306/13; B60Y 2400/81; B60Y 2400/90
See application file for complete search history.

(56) References Cited

U.S. PATENT DOCUMENTS

| | | | |
|---|---|---|---|
| 2015/0226805 A1* | 8/2015 | Albers | G07C 3/00 |
| | | | 702/182 |
| 2020/0031322 A1 | 1/2020 | Satoh et al. | |

FOREIGN PATENT DOCUMENTS

| | | | | |
|---|---|---|---|---|
| JP | 2001158336 A | | 6/2001 | |
| JP | 2010149587 A | | 7/2010 | |
| WO | WO-2014207242 A1 | * | 12/2014 | ......... G05B 23/0224 |
| WO | 2017119430 A1 | | 7/2017 | |
| WO | WO-2021166596 A1 | * | 8/2021 | .............. B60T 1/065 |

* cited by examiner

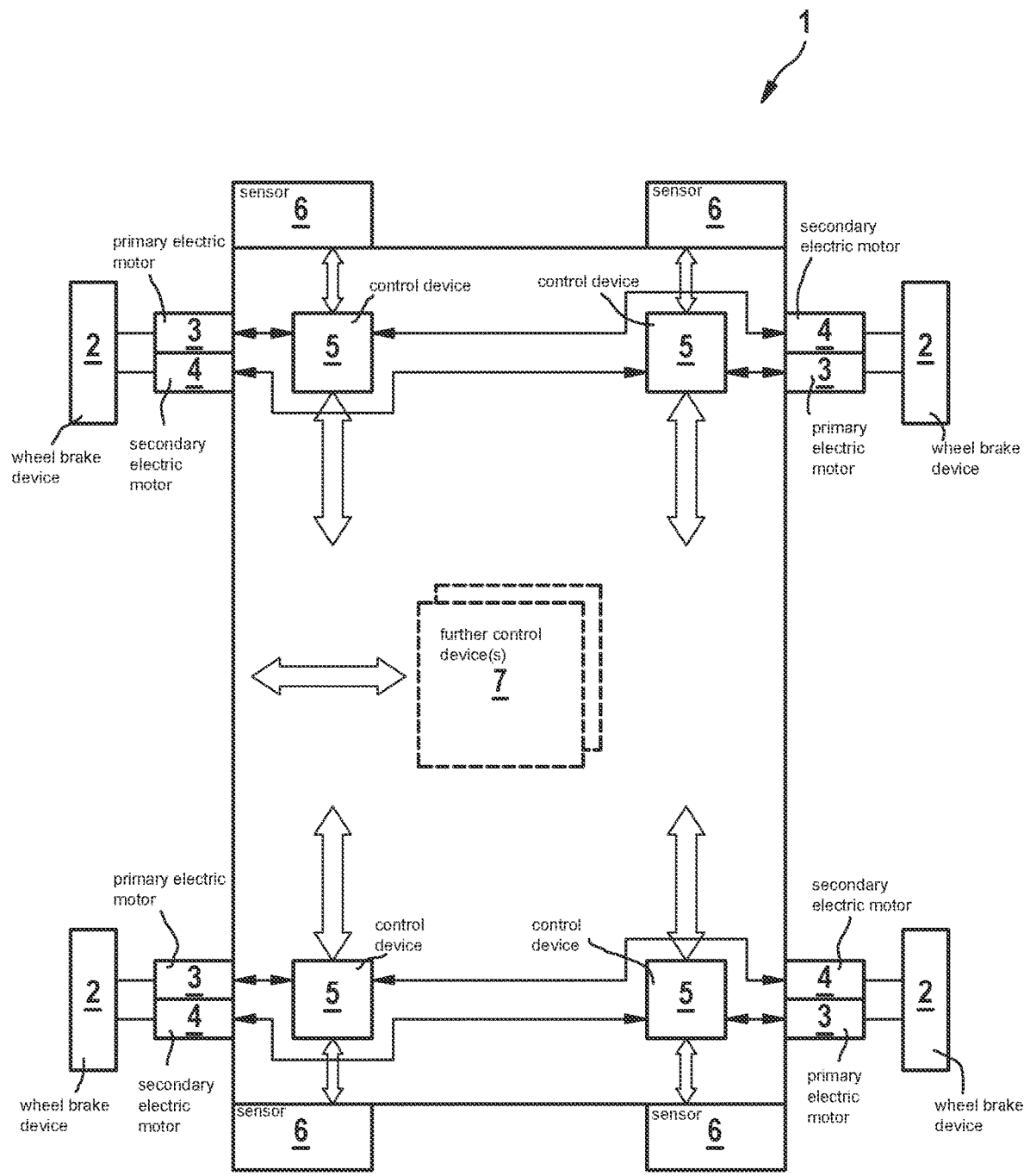

ELECTROMECHANICAL BRAKE SYSTEM FOR A MOTOR VEHICLE, METHOD

FIELD

The present invention relates to an electromechanical brake system for a motor vehicle, comprising four wheel brake devices, four primary electric motors, four secondary electric motors, and four control devices.

The present invention also relates to a method for operating such a brake system.

BACKGROUND INFORMATION

In order to carry out automated braking processes, for example in the context of autonomous driving of motor vehicles, a brake system of a motor vehicle must have actuators that can be actuated independently of a brake pedal operation by a driver of the motor vehicle. Such a brake system is designed, for example, as an electromechanical brake system and has a wheel brake device for each wheel of the motor vehicle. Each of these wheel brake devices is operated by an electric motor assigned thereto, in order to brake the motor vehicle. For actuating the electric motors, the brake system has one or more control devices.

It is prescribed by law that, for safety reasons, brake systems must be constructed in such a way that even in the event of a fault, i.e., in the event of a failure of one of the components of the brake system, the motor vehicle can continue to be braked at a predetermined minimum deceleration. In hydraulic brake systems, a mechanical coupling of the brake pedal to the wheel brake devices is usually provided for emergency operation. However, if the brake system is designed as a purely electromechanical system, in particular as a so-called "brake-by-wire" brake system, in which no mechanical emergency operation is possible, the braking in the event of a fault is usually ensured in that components of the brake system are installed redundantly and/or assume redundancy functions for one another.

Such brake systems with redundant components are described in the related art. For example, European Patent No. EP 3 318 458 B1 describes an electrical brake device for a motor vehicle with three control units, wherein each of the control units respectively controls two brake mechanisms for braking two wheels, and wherein in the event of a failure of one or two of the control units, at least one of the other control units actuates the respective brake mechanisms of the failed control unit so that the motor vehicle can continue to be braked. In particular, two of the control units are designed as diagonal wheel control units, and the third is designed as a front wheel control unit. Alternatively, it is provided to design the control units in such a way that they can each actuate all four brake mechanisms. However, a redundancy for the brake mechanisms themselves is not provided, meaning the braking power of the motor vehicle is reduced in the event of a failure of one of the brake mechanisms.

SUMMARY

In a brake system according to an example embodiment of the present invention, the control devices are designed to acquire and/or evaluate sensor data from sensors assigned to the wheel brake devices and/or to the motor vehicle, in that each of the wheel brake devices is respectively assigned one of the primary electric motors and one of the secondary electric motors in each case for operating the respective wheel brake devices, and in that, for actuating the electric motors, each of the control devices is respectively assigned to one of the primary electric motors of one of the wheel brake devices and to one of the secondary electric motors of another of the wheel brake devices. This achieves an advantageous redundancy both for the operation of the brake devices and for the actuation of the electric motors assigned to the wheel brake device. Two of the control devices, one of the primary electric motors and one of the secondary electric motors are thus assigned to each of the wheel brake devices so that the braking power of the brake system continues to be fully available even in the event of a failure of one or more of the control devices and/or the electric motors. The electric motors are in particular assigned to the relevant wheel brake device not only functionally, i.e., they are operatively connected or mechanically coupled to the brake device, but also spatially, i.e., they are arranged on the relevant wheel brake device. Each of the secondary electric motors represents a redundancy with respect to one of the primary electric motors. The secondary electric motors are thus used only if the relevant primary electric motor fails. It is in particular possible for the secondary electric motors to be specified in such a way that they only achieve a legally required minimum deceleration during braking and thus have a lower maximum electric power and size than the primary electric motors. Thus, in spite of the presence of redundancy, installation space is advantageously saved. The control devices are in particular only functionally assigned to the wheel brake devices, i.e., electrically connected to the wheel brake devices in terms of signaling, and are arranged at any location in the vehicle, or are in each case also spatially assigned to at least one of the wheel brake devices, i.e., are in particular arranged on the wheel brake device. By assigning control devices in each case to two wheel brake devices, only four rather than eight control devices are required to achieve the advantageous redundancy, so that the complexity and costs of the brake system are reduced. By designing the control devices to evaluate and/or acquire sensor data, further control devices specifically designed for this purpose are advantageously dispensed with or a redundancy with respect to such control devices is provided in that at least one of the sensors is installed redundantly and/or assigned to two control devices.

According to a preferred development of the present invention, it is provided that the sensors are designed as rotor position sensors, rotational speed sensors, airbag sensors, and/or distance sensors. Such a design of the sensors advantageously ensures that, for actuating the electric motors, relevant sensor data are directly acquired and/or evaluated by the control devices. If the electric motors are designed, for example, as electrically commutated electric motors, the exact angular position of their rotors must be acquired for actuation. If the control device acquires this directly via corresponding rotor position sensors, particularly advantageous, efficient actuation of the electric motors is ensured. By means of rotational speed sensors assigned to the wheels of the motor vehicle, the wheel speed is ascertained and can be taken into account during braking, for example in order to advantageously prevent one of the wheels from locking. Hazardous situations and/or accident situations can be recognized on the basis of the sensor data from airbag sensors and/or distance sensors so that the control devices can initiate braking, in particular emergency braking, if necessary. Preferably, at least one of the sensors is designed or arranged as a sensor close to the wheel, in particular as a microphone for noise monitoring. This likewise advantageously ensures direct acquisition and/or evaluation of relevant sensor data.

According to a preferred development of the present invention, it is provided that the primary electric motors and/or the secondary electric motors are designed as electrically commutated or brushless electric motors. By designing the electric motors as electrically commutated electric motors, it is advantageously ensured that the operation of the wheel brake devices is carried out efficiently. Preferably, only the primary electric motors are designed as electrically commutated electric motors, and the secondary electric motors are designed as direct current motors, which are advantageously space-saving. Alternatively, the primary electric motors and/or the secondary electric motors are designed as three-phase asynchronous motors. As a result, the electric motors are advantageously designed cost-effectively, in particular because such motors do not require rotor position sensors for acquiring the angular position of their rotors. It is also possible for one of the primary electric motors and one of the secondary electric motors to in each case be designed as a common electric motor with a primary motor winding and with a secondary motor winding, in particular stator windings, wherein the primary motor winding and the secondary motor winding can be actuated independently of one another, and wherein the electric motor is used as a primary electric motor when the primary motor winding is actuated, and the electric motor is used as a secondary electric motor when the secondary motor winding is actuated. The assignment of the motor windings to the control devices takes place analogously to the above-described assignment of the electric motors to the control devices. As a result, the electric motors are likewise advantageously designed cost-effectively, in particular because one of the primary electric motors and one of the secondary electric motors are thus in each case arranged in a common housing with only one rotor.

According to a preferred development of the present invention, it is provided that the control devices are each arranged closer to the wheel brake device to whose primary electric motor they are assigned than to that wheel brake device to whose secondary electric motor they are assigned. Such an arrangement of the control devices advantageously ensures that the length of the potentially error-prone electrical lines between the relevant primary electric motor and the control device is minimized so that the reliability of the actuation is increased. Alternatively, the control devices are arranged in a protected region of the motor vehicle, in which they are exposed to lower temperature requirements and environmental influences than in the vicinity of the wheel brake devices, where they are designed to be less robust and thus advantageously more cost-effective.

According to a preferred development of the present invention, it is provided that the other of the wheel brake devices is arranged on the same wheel axle of the motor vehicle. Such an arrangement advantageously ensures that two of the control devices each assume a redundancy function for one another on the same wheel axle, and thus, even if all but one control device fails, at least both wheel brake devices on one of the two axles can be actuated. The brake system is designed with parallel redundancy with respect to the axles.

According to a preferred development of the present invention, it is alternatively provided that the other of the wheel brake devices is assigned to the other wheel axle of the motor vehicle and is arranged at an end of the wheel axle opposite one of the wheel brake devices. Such an assignment advantageously ensures that each of the control devices in each case actuates one of the electric motors on each of the two axles, and thus, even if all but one control device fails, one of the wheel brake devices on each of the two axles can still be operated. The brake system is designed to be diagonally redundant with respect to the axles.

In a method according to the present invention, the electric motors and the control devices of the brake system are monitored for functionality, and in that in the event of a failure of one of the electric motors or of one of the control devices, a replacement response is triggered. By monitoring functionality and triggering the replacement response, it is advantageously ensured that a failure of one of the electric motors and/or of one of the control devices is detected without delay, and that the braking effect of the brake system continues to be maintained.

According to a preferred development of the present invention, it is provided that in the event of a failure of one of the primary electric motors, the secondary electric motor assigned to the same wheel brake device is actuated as a replacement response. By actuating the secondary electric motor, the operation of the wheel brake device advantageously continues to be ensured.

According to a preferred development of the present invention, it is provided that in the event of a failure of one of the control devices, the control device assigned to the same wheel brake devices is actuated as a replacement response. By actuating the control device, the operation of the two wheel brake devices advantageously continues to be ensured.

According to a preferred development of the present invention, it is provided that a warning message is output as a replacement response, in particular on a display device assigned to a driver of the motor vehicle. By outputting the warning message, it is advantageously ensured that the driver is informed about the failure without delay and can take appropriate measures, in particular discontinue the trip and/or visit a workshop. Preferably, the warning message is output simultaneously with one of the above-described replacement responses, in which, by appropriately actuating one of the control devices and/or one of the electric motors, a failure of another of the control devices and/or of another of the electric motors is compensated. If only the failure of one of the secondary electric motors is detected, in particular no change in the actuation will be necessary but outputting the warning message will be sufficient. Preferably, the warning message is output according to the relevance or severity of the failure, e.g., is color-coded differently. For example, a failure of one of the secondary electric motors would only be indicated with a yellow warning lamp, while a failure of one of the primary electric motors and/or of one of the control devices would be indicated with a red warning lamp. Likewise, different instructions could advantageously be output to the driver, e.g., a request to immediately interrupt the journey in the event of a failure of one of the primary electric motors and/or of one of the control devices.

Further preferred features and combinations of features result from what is disclosed herein. The present invention is explained in more detail below with reference to the FIGURE.

BRIEF DESCRIPTION OF THE DRAWING

The FIGURE shows a schematic representation of an electromechanical brake system.

DETAILED DESCRIPTION OF EXAMPLE EMBODIMENTS

An advantageous electromechanical brake system 1 for a motor vehicle (not shown in more detail) is described below with reference to the FIGURE. The brake system 1 has exactly four wheel brake devices 2. Each of the wheel brake devices 2 is assigned to one of the wheels (likewise not shown) of the motor vehicle. In the present exemplary embodiment, the brake system 1 is designed purely electromechanically, and thus has no hydraulic components or hydraulic fluid circuit for operating the wheel brake devices 2.

Instead, braking takes place by directly operating the wheel brake devices 2, which are in particular designed as friction brake devices. For this purpose, the brake system 1 has exactly four primary electric motors 3 and exactly four secondary electric motors 4. In the present exemplary embodiment, the electric motors 3, 4 are designed as electrically commutated electric motors. Each of the wheel brake devices 2 is respectively assigned one of the primary electric motors 3 and one of the secondary electric motors 4 in each case for operating the relevant wheel brake device 2.

In addition, the brake system 1 has exactly four control devices 5. For actuating the electric motors 3, 4, each of the control devices 5 is respectively assigned to one of the primary electric motors 3 of one of the wheel brake devices 2 and to one of the secondary electric motors 4 of another of the wheel brake devices 2. In this case, the other of the wheel brake devices 2 is in each case assigned to the same wheel axle of the motor vehicle. The control devices 5 are each arranged closer to the wheel brake device 2 to whose primary electric motor 3 they are assigned than to the wheel brake device 2 to whose secondary electric motor 4 they are assigned.

Each of the secondary electric motors 4 assumes a redundancy function for the primary electric motor 3 assigned to the same wheel brake device 2. In the event of a failure of the corresponding primary electric motor 3, the secondary electric motor 4 assigned to the same wheel brake device 2 will then be actuated.

Likewise, each of the control devices 5 assumes a redundancy function for the other control device 5 which is assigned to the same wheel brake devices 2. In the event of a failure of one of the control devices 5, the control device 5 assigned to the same wheel brake devices 2 is then actuated.

The control devices 5 are furthermore designed to acquire and/or evaluate sensor data from sensors 6 assigned to the wheel brake devices 2 and/or to the motor vehicle. The sensors are, in particular, rotor position sensors of one of the electric motors 3, 4, rotational speed sensors of one of the wheels of the motor vehicle, airbag sensors of the motor vehicle, and/or distance sensors of the motor vehicle.

Furthermore, the control devices 5, as indicated by double arrows, are connected, in terms of communications, via a bus system, e.g., Ethernet, FlexRay or CAN, to one another and also to further control devices 7 of the motor vehicle. At least one of the further control devices 7 is designed, for example, to further process the sensor data acquired or evaluated by the control devices 5.

Moreover, for example, at least one of the further control devices 7 is designed to monitor the electric motors 3, 4 as well as the control devices 5 for functionality and, in the event of a failure of one of the electric motors 3, 4 and/or of one of the control devices 5, to trigger appropriate replacement responses, in particular to change the actuation as described above and/or to output an error message.

The invention claimed is:

1. An electromechanical brake system for a motor vehicle, comprising:
   four wheel brake devices;
   four primary electric motors;
   four secondary electric motors; and
   four control devices, wherein the control devices are configured to acquire and/or evaluate sensor data from sensors assigned to the wheel brake devices and/or to the motor vehicle;
   wherein each of the wheel brake devices is respectively assigned a respective one of the primary electric motors and a respective one of the secondary electric motors for operating the respective wheel brake devices;
   wherein, for actuating the electric motors, each of the control devices is respectively assigned to a respective one of the primary electric motors of one of the wheel brake devices and to a respective one of the secondary electric motors of another of the wheel brake devices; and
   wherein the primary and secondary electric motors, and the control devices are monitored for functionality, wherein a replacement response is triggered based on a failure of one of the primary and secondary electric motors or of one of the control devices, and wherein, based on a failure of one of the primary electric motors, the secondary electric motor assigned to the same wheel brake device is actuated as the replacement response.

2. The brake system according to claim 1, wherein the sensors are rotor position sensors, and/or rotational speed sensors, and/or air bag sensors, and/or distance sensors.

3. The brake system according to claim 1, wherein the primary electric motors and/or the secondary electric motors are electrically commutated electric motors.

4. The brake system according to claim 1, wherein each of the control devices is arranged closer to the wheel brake device to whose primary electric motor it is assigned than to the wheel brake device to whose secondary electric motor it is assigned.

5. The brake system according to claim 1, wherein the other of the wheel brake devices is arranged on the same wheel axle of the motor vehicle.

6. The brake system according to claim 1, wherein the other of the wheel brake devices is assigned to the other wheel axle of the motor vehicle and is arranged at an end of the wheel axle opposite one of the wheel brake devices.

7. A method for operating an electromechanical brake system, the brake system including:
   four wheel brake devices,
   four primary electric motors,
   four secondary electric motors, and
   four control devices, wherein the control devices are configured to acquire and/or evaluate sensor data from sensors assigned to the wheel brake devices and/or to the motor vehicle,
   wherein each of the wheel brake devices is respectively assigned a respective one of the primary electric motors and a respective one of the secondary electric motors for operating the respective wheel brake devices, and
   wherein, for actuating the electric motors, each of the control devices is respectively assigned to a respective one of the primary electric motors of one of the wheel brake devices and to a respective one of the secondary electric motors of another of the wheel brake devices, the method comprising the following steps:
- monitoring the primary and secondary electric motors, and the control devices for functionality;
- triggering, based on a failure of one of the primary and secondary electric motors or of one of the control devices, a replacement response;
- wherein, based on a failure of one of the primary electric motors, the secondary electric motor assigned to the same wheel brake device is actuated as the replacement response.

8. The method according to claim 7, wherein, based on a failure of one of the control devices, the control device assigned to the same wheel brake devices is actuated as the replacement response.

9. The method according to claim 7, wherein a warning message is output as the replacement response, the warning message being output on a display device assigned to a driver of the motor vehicle.

* * * * *